Dec. 3, 1963    P. J. McKENZIE    3,112,888
FLAT BED TRAILER CLEARANCE LIGHTS
Filed Feb. 28, 1961    2 Sheets-Sheet 1
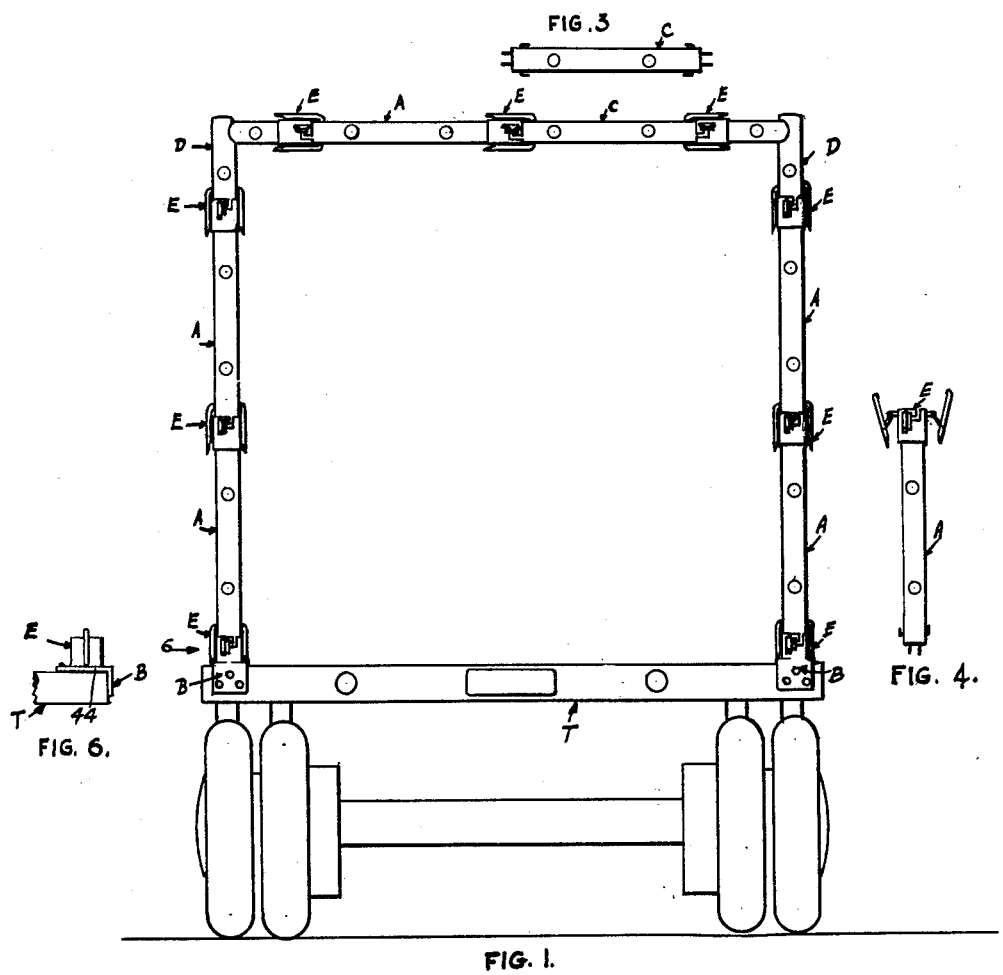
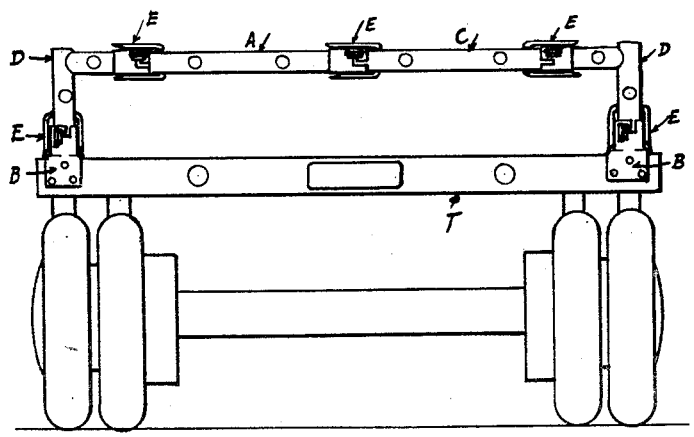
INVENTOR
PAUL J. McKENZIE.
BY *Robert L. Dunn*,
ATTORNEY Dec. 3, 1963 P. J. McKENZIE 3,112,888
FLAT BED TRAILER CLEARANCE LIGHTS
Filed Feb. 28, 1961 2 Sheets-Sheet 2

INVENTOR
PAUL J. McKENZIE

BY *Robert L. Gunn,*
ATTORNEY

United States Patent Office 3,112,888
Patented Dec. 3, 1963

3,112,888
FLAT BED TRAILER CLEARANCE LIGHTS
Paul Jerold McKenzie, 251 Price St., Daly City, Calif., assignor of one-fourth to Dr. D. Catalano, Castro Valley, Calif.
Filed Feb. 28, 1961, Ser. No. 92,275
2 Claims. (Cl. 240—8.3)

This invention relates to trucking equipment and deals with clearance lights or rear end safety lights for trucks and/or trailers having low beds with no super structure.

The primary object of the hereinafter described invention is the provision of means for lighting the rear ends of low bed, or the flat bed trucks or trailers with lights that will outline the size of the load on the vehicle. In the case of the vans or the larger cargo carrying trailers or semi-trailers, the super structure of the vehicle is outlined by lights which give the other drivers a definite idea of the size of the vehicle ahead of them, whereas, the flat bed, or low bed, trailer usually displays a single light on each side of the vehicle, generally under the rear end of the truck platform. The driver approaching from the rear in night driving has no way of telling what the type or size of the vehicle is ahead of him until his own headlights show it up for him. This at times can prove to be dangerous.

Another object of this invention is to provide a lighting system for the purpose described that is composed of units which are readily assembled and disassembled to meet the requirements for different sizes of loads. In the case of an empty vehicle, the lights would be low, near the level of the truck platform, but with the trailer loaded, the lights could extend up to the height of the load, and would outline the size and the extent of the load.

In practice, my invention consists of several standardized units which can be interlocked to provide a lighting system which may be expanded to the desired size merely by adding additional units.

A further object is to provide the interlocking units for the purpose described.

Briefly stated, my invention consists of four units, which are standardized and provided with interlocking means to form a string of lights around the rear end of a flat bed truck or trailer that may be set up to conform to the size of the load on the vehicle.

Other objects and advantages will become apparent as the description proceeds in conjunction with the drawings in which:

FIG. 1 is the rear end of a flat bed vehicle outlined with a load;

FIG. 2 is the same with no load;

FIG. 3 is the connecting unit, used to connect the two sides of the lighting system at the top;

FIG. 4 is the standard unit used to form the outline of the load;

FIG. 5 is the corner unit;

FIG. 6 is a side view of the base unit that is attached to the platform of the vehicle, taken in the direction of arrow 6 FIG. 1;

Figure 7:
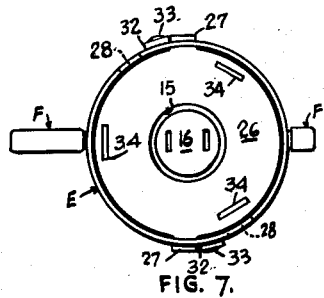
FIG. 7 is a top view of the standard unit used to form the outline of the load, greatly enlarged.
Figure 9:
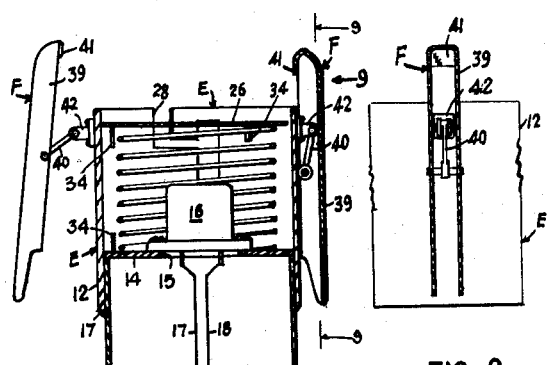
FIG. 9 is a view of the means for applying pressure to hold the units rigidly together.

Referring to the drawings, it can be seen that my invention comprises four units as follows: Unit A which is the standard unit; B which is the base unit attached to the platform of the trailer or truck; C which is the connecting unit used to connect the two sides of the lighting system; and D which is the corner unit.

FIG. 1 shows how the units are used to outline a load on a flat bed trailer. Here, it will be seen that the system consists of the units B and D, one of the units E and five of the units A. In practice, a trailer would be equipped with two of the units, B and D, one of the units C, and enough A units to outline the largest expected load on the trailer. These units would ordinarily become part of the truck equipment and would be carried the same as other accessories.

In FIG. 2 I have shown the same vehicle with no load. In this case, the system consists of two of the standard units A, B, and D and one of C. It is to be understood that the lighting system I provide is connected to the conventional electrical system for lighting trucks and trailers and is controlled by the regular switching arrangement usually mounted in the cab of the truck.

The units A, B, C and D will now be described.

Taking up first the unit A which is illustrated in FIGS. 7, 8, 9, 10 and 11, it is pointed out that this unit is the one of which more than one is required. Essentially this unit consists of a sleeve or barrel 11 having a collar 12 secured to one end such as by welding 13. In the collar 12 I mount the structure for connecting the units together. It should be explained that one of the objects of the invention is to provide an arrangement of the character described which can be assembled and mounted on the rear end of a trailer which is self supporting and rigid enough to sustain itself in place without any outside support, taking into consideration the stress and strain of the load and the vibration set up by the movement of the vehicle over the road. For this reason, I have provided a special connecting structure, designated E in its entirety, which is an essential part of Units A, B, and D but not of C.

Figure 8:
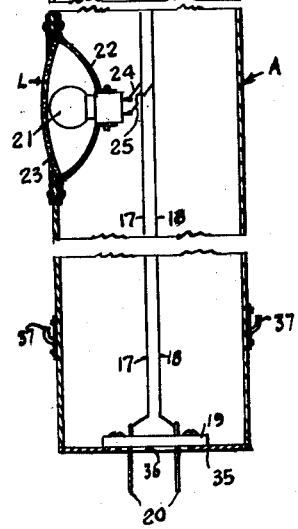
FIG. 8 is a vertical section of the same.

Referring to FIG. 8, it will be seen that the means E for making rigid connections between the units comprises a plate 14 mounted on the end of the sleeve 11 inside the collar 12 in any suitable manner such as by welding before assembling. The plate 14 has a hole 15 in the center over which I mount the plug receiving part of an electrical connector generally designated 16. Wires 17 and 18 extend from this part to the opposite end of the sleeve 11 and are connected to the plug component of the connector designated 19. The plug component carries the prongs 20 in the conventional manner. Throughout the length of the sleeve 11 I mount a plurality of lights, generally designated L, one of which is shown in FIG. 8. The lights conform to the conventional lights now in use on automotive equipment and may take a variety of forms. As I have illustrated, it consists of a light 21, mounted in a reflector 22 secured to the wall of the sleeve 11. A protective lens 23 is used to cover and protect the light. The electrical circuit is connected to the light in a conventional manner by wires 24 and 25 being connected to the wires 17 and 18 respectively.

Above the plate 14, I mount another plate 26. This plate is equipped with a central hole and also with ears 27 substantially opposite each other which are adapted to slip into slots 28 and permit the plate 26 to be depressed against a spring 29 until its ears 27 can be slid through a cross slot 30 to another vertical slot 31 which permits them to rise slightly above the slot 30 in response to the spring pressure. The ears 27 may then be locked in the slot 31 by a small strap 32 held over the slot 30 by screws 33. The spring 29 is held in place between the plates 14 and 26 by small tongues 34 struck from the material of the plates. This is the normal open condition of the connector.

The above structure is provided to supply a connection between the units that is under pressure at all times to keep the assembled structure sufficiently rigid to support itself.

Figure 10:
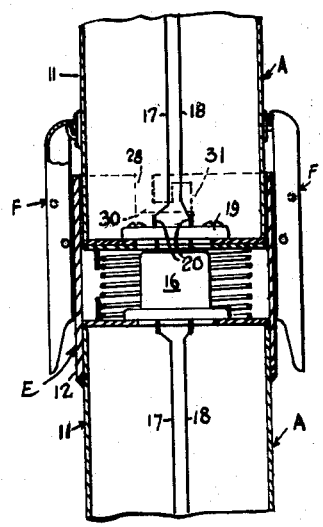
FIG. 10 is a vertical section showing the means for coupling the units together.
Figure 11:
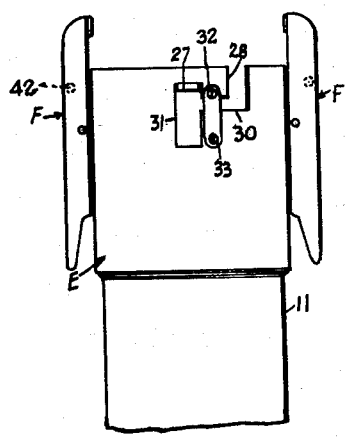
FIG. 11 is a fragmentary front view of the coupling means taken substantially on line 11, FIG. 7.

The connection between two units A is shown in FIG. 10. It is to be understood that the same connection is used throughout the entire system. Referring back to FIG. 8 briefly, it is pointed out that the plug member 19 is mounted on a plate 35 which is mounted over the end of the sleeve 11. The plate is formed with a central hole 36 through which the prongs 20 extend. Mounted on the exterior wall of the sleeve is a pair of diametrically spaced hooks 37 which will be explained in connection with forming the coupling between the two units.

In coupling the units with each other, the end of the unit having the prongs is slipped into the open end of the collar 12 with the prongs 20 passing through the hole in plate 26 and entering the conventional slots provided in conventional plug receiving fixtures. The hooks 37 are thus positioned above a pair of clamping means generally designated F. The means F is a springless clamp adapted to draw the two units together, and as shown is composed of a channel shaped arm 39 pivotally mounted on a lever 40, the lever in turn being pivotally mounted on an upstanding stud 42 mounted on the exterior of the collar near the upper end. It will be noted that the pivot point of the lever on the arm is below the pivot point of the lever on the stud when the arm is closed against the collar 12. This will hold the arm closed so long as pressure is applied to the connection by the spring 29. I also provide a return bend 41 at the end of the arm to aid in grasping the hook 37 by the arm to bring pressure on the joint. When the arms engage their hooks 37 and are pulled against the wall of the collar, the joint is locked and the pressure exerted by the spring 29 will keep it locked until opened by releasing the arms F. A joint of this nature will be sufficiently rigid to hold the assembled structure in position against the stress and strain of a load as well as the vibration set up by the movement of the trailer over the road.

Referring to the unit B, FIG. 6, it will be seen to comprise a connecting element E mounted on a flange 44 which is bent over the end of the trailer bed to form a suitable means for mounting on the trailer platform. It is to be understood that there are two of these units, one on each side of the platform of the trailer and that the source of electricity is connected to only one of them to put the control of the systems under a single switch.

The unit C is a double ended unit, that is, it has prongs on both ends that fit into the connecting element E so that it may be inserted in a system built up from both sides of the platform of the trailer. It has the same structure on both ends as shown on unit A on the end opposite the connecting element E.

The unit D is a corner unit and amounts to nothing more than an A unit bent at a right angle.

In practice, the low lights would be used at all times, while the outline lights, as shown in FIG. 1 would be used only in case the trailer was loaded. The height of the lights when loaded could be optional or it could follow the height of the load.

A lighting system of the foregoing character would add much to safety driving particularly where trucks and trailers are mingled with passenger cars duirng night driving.

I claim:

1. A standardized lighting unit for forming clearance lights on flat bed trailers comprising, a barrel having a plurality of lights spacedly mounted along the length of said barrel, an electrical plug member mounted on one end of said barrel, said plug member having prongs extending beyond the end of said barrel, means for connecting said standardized unit with like units to complete an electrical circuit through said connection and provide a substantially rigid structure thereof, said means including a collar on said barrel, a plate on the end of the barrel inside said collar, said plate having a central hole therethrough, a prong receiving member mounted on said plate over said hole, wires connecting said prong receiving member with said plug member, a second plate above said first mentioned plate slidably supported in said collar by a spring between said plates, means for holding said second plate in said collar, and clamping means on said collar for drawing one end of a standardized unit into said collar to compress said spring and form an electrical connection between said plug member and said prong receiving member.

2. A system for mounting clearance lights on a flat bed truck comprising a rigid base unit mounted on the rear end of the bed of said trailer, a socket in said base unit adapted to receive a pair of prongs, means for optionally supplying electric current to said socket, a substantially straight unit having a rigid casing with a pair of prongs on one end detachably inserted into said socket, a socket at the opposite end of said casing adapted to receive a pair of prongs, electrical conductors connecting said socket to said prongs on said casing, at least one light mounted on said casing intermediate its ends connected between said conductors, means for clamping said straight unit to said base unit to form a rigid electrical connection therebetween, a rigid corner unit having a pair of prongs on one end detachably inserted into the socket on said straight unit, a socket on the opposite end of said corner unit substantially at a right angle to the prongs on the same adapted to receive a pair of prongs, electrical conductors connecting the prongs on said corner unit to the socket thereon, at least one light on said corner unit intermediate its ends connected between said conductors, means for clamping said corner unit to said straight unit to form a rigid electrical connection therebetween, a substantially straight unit having a rigid casing with a pair of prongs on each end with one pair of prongs inserted into the socket on said corner unit, electrical conductors connecting said pairs of prongs respectively, at least one light on said last mentioned rigid casing intermediate its ends connected between said conductors, and cooperative means on said last mentioned casing for clamping the other pair of prongs on said last mentioned unit to a socket to form a rigid electrical connection therebetween.

References Cited in the file of this patent

UNITED STATES PATENTS

| | | |
|---|---|---|
| 1,607,922 | Schweitzer | Nov. 23, 1926 |
| 2,069,238 | Fraser | Feb. 2, 1937 |
| 2,175,145 | Davison | Oct. 3, 1939 |
| 2,518,464 | Guillemin | Aug. 15, 1950 |
| 2,818,497 | Alden | Dec. 31, 1957 |
| 2,821,038 | Gee | Jan. 28, 1958 |
| 2,853,595 | Baldwin | Sept. 23, 1958 |
| 2,952,829 | Grohsgal | Sept. 13, 1960 |
| 2,969,919 | Kornberg | Jan. 31, 1961 |

FOREIGN PATENTS

| | | |
|---|---|---|
| 230,050 | Germany | Jan. 13, 1911 |
| 1,124,011 | France | June 25, 1956 |